July 18, 1933.  C. J. ANDERSON  1,918,951
GRINDING MACHINE
Filed Jan. 26, 1931   2 Sheets-Sheet 1
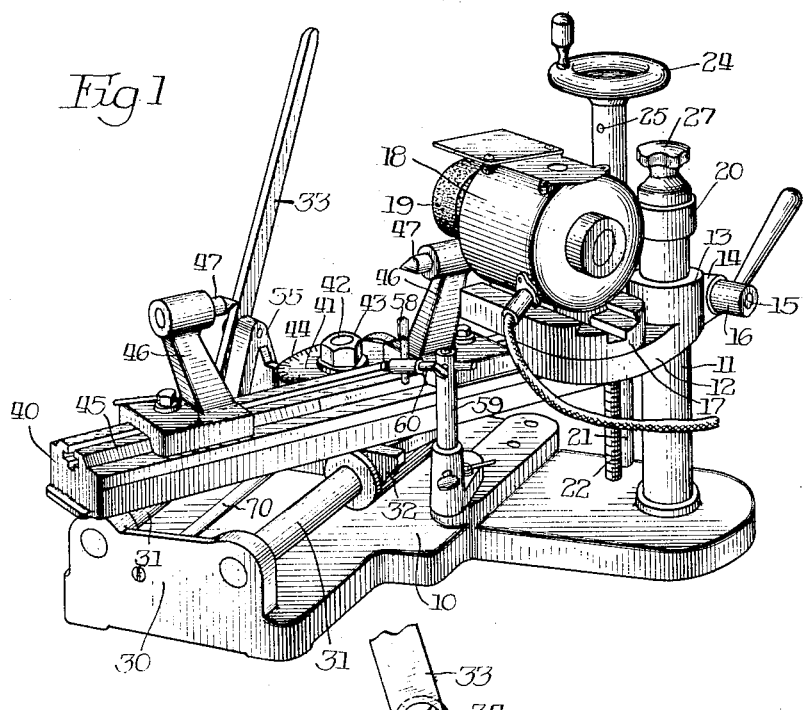
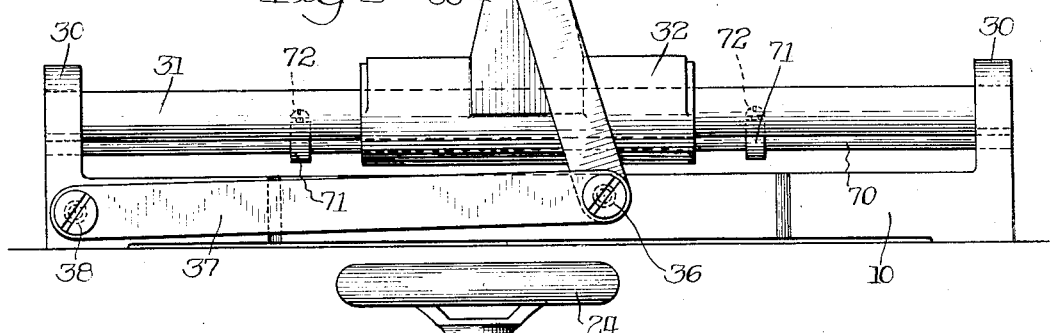
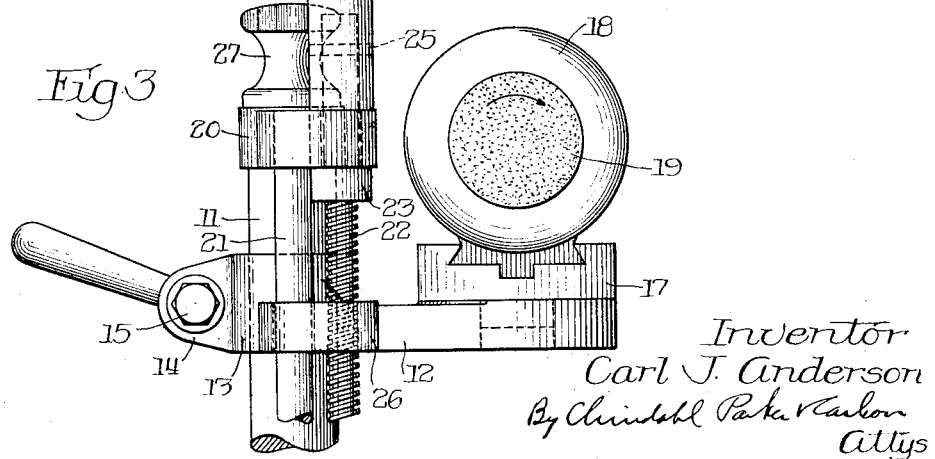
Inventor
Carl J. Anderson

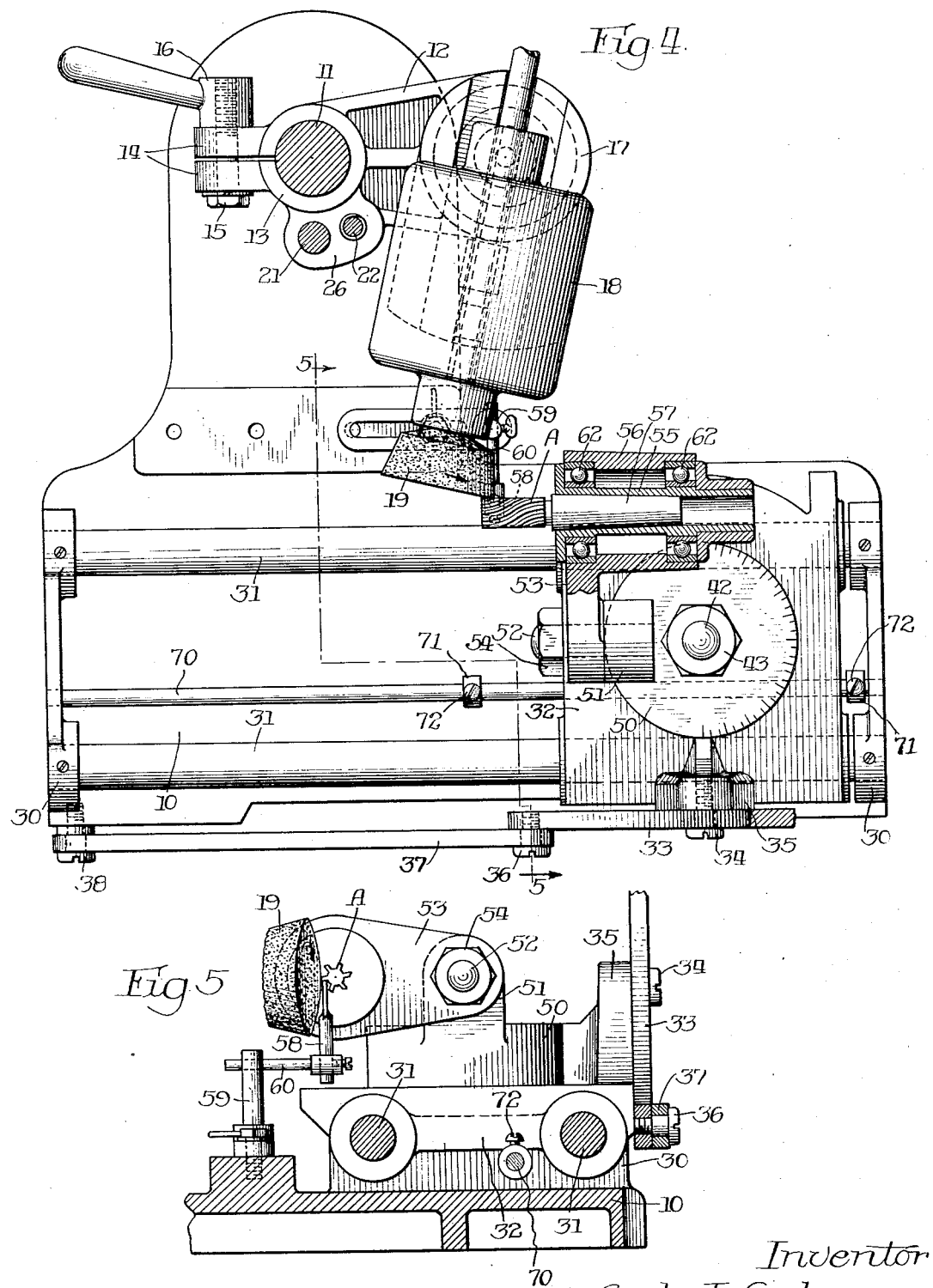

Patented July 18, 1933

1,918,951

UNITED STATES PATENT OFFICE

CARL J. ANDERSON, OF CHICAGO, ILLINOIS, ASSIGNOR OF FIFTEEN PER CENT TO CARL U. JOHANSON AND FIFTY-ONE AND TWO-THIRDS PER CENT TO ERIK BORG, BOTH OF CHICAGO, ILLINOIS

GRINDING MACHINE

Application filed January 26, 1931. Serial No. 511,195.

The invention relates generally to grinding machines and more particularly to a bench type machine for grinding work such as milling cutters or the like.

The general object of the invention is to provide a novel grinding machine which is universally adjustable to accommodate a wide variety of work, which is easily adjustable and convenient to operate, and which is capable of producing accurate work.

Another object is to provide a machine adapted to grind relatively small helical-blade milling cutters and having novel means for supporting and rotating the cutter so that the latter may be easily turned in accordance with the helix of the blades as the grinding progresses.

A further object is to provide a machine of this character having novel means for accurately adjusting the grinding wheel and novel means for feeding the work relative to the grinding wheel, both of which means are convenient to operate and simple to construct.

Other objects and advantages will become apparent from the following description taken in connection with the accompanying drawings, in which:

Figure 1 is a perspective view of a machine embodying the features of the invention.

Fig. 2 is an enlarged fragmentary elevation of the left hand side of the machine as viewed in Fig. 1.

Fig. 3 is an enlarged fragmentary elevation of means for adjusting the grinding wheel.

Fig. 4 is an enlarged plan view partially in section of a modified form of the machine.

Fig. 5 is a fragmentary sectional view taken on the line 5—5 of Fig. 4.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In its present embodiment, the machine comprises in general a frame upon which is mounted a universally adjustable support carrying a motor with a grinding wheel mounted directly on its shaft, a manually operable screw being provided for adjusting the motor support vertically. Also mounted on the frame is an adjustable work support which is constructed so that it may be reciprocated relative to the grinding wheel by means of a hand lever. Guide means are provided in order to guide a work piece, such as a milling cutter, relatively to the grinding wheel in accordance with the type of blade of the cutter. The work support of the modified form of the machine, shown in Figs. 4 and 5, which is especially adapted for relatively small helical-blade cutters, is constructed so that the cutter may be turned by the guide means in accordance with the helix of the blades without danger of binding or jamming as it is reciprocated relative to the grinding means.

As shown in the drawings, the frame comprises a base 10 adapted to rest on a bench. Extending upwardly from the base is a post 11 upon which a universally adjustable motor support is slidably mounted. The latter comprises an arm 12 having a split hub 13 fitting around the post 11. A pair of lugs 14 are formed on the hub 13 on the respective sides of the split and have a bolt 15 passing therethrough with a hand nut 16 threaded to the bolt 15 in order to draw the lugs 14 together to clamp the arm 12 securely to the post 11.

On the free end of the arm 12, a slide 17 is pivotally mounted and an electric motor 18 is slidably supported in dovetails formed on the upper surface of the slide 17. A grinding wheel 19 is secured on the end of the motor shaft, the wheel being of any desired form. Thus, through the vertical movement of the arm 12, the pivotal movement of the latter and the slide 17, and the sliding movement of the motor, complete universal adjustment for the position of the grinding wheel is provided.

To move the motor support vertically, a manually operable means is provided which comprises, in the present embodiment, a bracket 20 mounted on the top of the post 11 and permitted to turn relative thereto but fixed against vertical movement. A guide rod 21 is fixed in the end of the bracket 20 parallel to the post 11, and closely adjacent to the guide rod 21, a screw 22 is rotatably mounted. To secure the screw 22 against vertical movement, a shoulder 23 (Fig. 3) is formed integrally with the screw and is adapted to be held against the under surface of the bracket 20 by the hub of a hand wheel 24 secured on the upper end of the screw and abutting the upper surface of the bracket 20. The hand wheel 24 is secured to the screw 22 as by a pin 25 and is employed to rotate the screw.

The guide rod 21 and the screw 22 extend through a lug 26 formed on the side of the arm 12, the screw being threaded therein, so that when the screw is turned by means of the hand wheel 24, the arm 12 is raised or lowered. The bracket 20 is permitted to turn on the post 11 so that it may follow the lug 26 on the arm 12 when the latter is adjusted about its vertical axis. When the arm 12 is locked in its adjusted position, by means of the hand nut 16, the bracket 20 may also be locked against rotation by a hand nut 27 threaded on the upper end of the post 11 over the bracket 20.

As mentioned above, an adjustable work support is mounted on the base 10. To this end, a pair of uprights 30 are formed integrally on the base and mounted horizontally in the uprights 30 are a plurality of parallel spaced guide bars 31 which slidably support a carriage 32. In the present instance two such bars are shown, each being a round rod to simplify their manufacture and to facilitate the fitting of the carriage 32 thereto.

The carriage 32 is of substantial length in order to provide adequate bearing surface on the guide bars 31 to resist any tendency to cant when pressure is applied to the work. To reciprocate the carriage on the bars 31, a hand lever 33 is provided which, in the present instance, is pivoted intermediate its ends, as by a screw 34, on a projecting portion 35 of the carriage. The lower end of the lever 33 is pivoted, as by a screw 36, on one end of a link 37, the other end of which is pivotally attached to the base 10 as at the end thereof by a screw 38. Thus, when the lever 33 is rocked in a vertical plane, the carriage is reciprocated on the guide bars 31.

In grinding some classes of work, it is necessary to limit the movement of the carriage to a definite point, in order that all blades may be ground equally. For this purpose, a rod 70 is mounted to extend between the uprights 30 parallel to the guide 31 and spaced therebetween. Slidably mounted on the rod 70 at each side of the carriage is a collar 71 which is adapted to be locked on the rod 70 in any predetermined position as by a screw 72 threaded transversely through the collar. The collars 71 are of such diameter that, when locked, they form an abutment against which the carriage strikes in its reciprocation, thus limiting the movement given to the cutter to a predetermined point. The collars 70 may also be used to lock the carriage in a predetermined position when it is desired to hold the latter rigidly stationary.

Mounted on top of the carriage 32 is means for supporting the work. In the form shown in Fig. 1, this means is arranged for work adapted to be supported on centers and comprises a table 40 having a boss 41 formed on one side thereof, which is seated on the upper face of the carriage 32 and is secured thereto as by a screw 42 secured in the carriage and a nut 43. The nut and screw permit the table 40 to be angularly adjusted about a vertical axis and to be clamped in its adjusted position. To facilitate this adjustment, a scale 44 is marked on the upper surface of the boss 41 to cooperate with a fixed mark on the adjacent projecting portion 35 of the carriage.

The table 40 has a guide 45 formed longitudinally thereon on which is positioned a pair of slides 46 adapted to be clamped to the table and each carrying a center 47 arranged to receive the work piece. Thus, a work support is provided which may be adjusted angularly about a vertical axis and horizontally by means of the guides 45, and which is adapted to be horizontally reciprocated by the hand lever 33.

In the form of machine illustrated in Figs. 4 and 5, the means for supporting the work is especially adapted for work such as a milling cutter having a shank and comprises a boss 50 angularly adjustable on the upper surface of the carriage 32 and adapted to be clamped thereto by the screw 42 and nut 43. An angularly graduated scale may be provided on the upper surface of the boss 50 to cooperate with the fixed mark on the projecting portion 35 of the carriage. Formed on the boss 50 is an upwardly extending lug 51 carrying a horizontally extending screw 52 on which is mounted a pivotally adjustable arm 53, a nut 54 being threaded on the screw 52 to clamp the arm 53 in its adjusted position against the lug 51.

The arm 53 is adapted to rotatably support the cutter to be ground. To this end, a rotatable hollow member 55 (see Fig. 4) is positioned within a hub 56 formed on the free end of the arm 53. The inner surface of the hollow member 55 is tapered to a standard Morse taper and within it is positioned a tapered sleeve 57 adapted to receive the shank of a milling cutter A. Thus, the cutter may be supported in a position where its side is parallel to the direction of movement of the carriage 32 and may be moved thereby in grinding relation to the grinding wheel 19.

For grinding cutters having helical blades, a finger 58 adapted to abut against a blade is adjustably secured on the base 10 as by an upright 59 and an extension 60. Thus, as the carriage is reciprocated, the cutter is rotated by the finger in accordance with the helix of the blade.

When helical blade cutters, smaller than the diameter of the rotatable member 55, are to be ground, it is found that the forces arising when the cutter is reciprocated against the finger 58 are such that it is impossible to employ a plain sliding bearing between the rotatable member 55 and the hub 56, these forces causing a binding and jamming of such extent that it is impossible to rotate the cutter by means of the finger 58. This effect is noticed when the diameter of the cutter is less than the diameter of the bearing, the latter being the critical point for the cutter below which it is impossible to use a plain bearing.

It has been found, however, that a bearing having rolling elements, such as ball-bearings 62 interposed between the hub 56 and the rotatable member 55 at the respective ends thereof, permits the cutter to be freely rotated by the finger 58, even when the cutter is substantially smaller than the rotatable member 55. The mere difference in friction between a plain bearing and a ball bearing is not sufficient to account for this result so that it is apparent that, under the particular forces set up when the cutter is reciprocated against the finger 58, the ball bearings so modify and alter these forces that there is no tendency for the bearing to bind or jam.

The grinding wheel 19 is rotated in the direction shown by the arrows in Figs. 3 and 5. Thus, the rotation of the wheel when grinding a cutter tends to rotate the cutter but the finger 58 holds the cutter against such rotation and maintains the blade in proper grinding relation to the wheel 19. In straight blade cutters, the finger holds the cutter against all rotation while, with helical blade cutters, the finger causes a rotation conforming to the pitch of the helix.

It is evident from the above description that I have provided a novel grinding machine which is adapted to accommodate a wide variety of work and which is easily adjustable and convenient to operate.

I claim as my invention:

1. A machine for grinding helical-blade milling cutters or the like comprising, in combination, a frame, a carriage slidably mounted on said frame, means mounted on said carriage for supporting the cutter with its axis parallel to the direction of movement of said cutter, means mounted on said frame for grinding the cutter, and a finger mounted on said frame arranged to abut against a blade of the cutter to cause rotation of the cutter in accordance with the pitch of the helix as the carriage is moved, said cutter-supporting means having a rotatable member adapted to receive the shank of the cutter and mounted on ball bearings, so that when the cutter is of a smaller diameter than the diameter of the inner race of said bearing, the cutter may be freely turned by said finger.

2. A machine for grinding helical-blade milling cutters or the like comprising, in combination, a frame, a carriage slidably mounted on said frame, means mounted on said carriage for rotatably supporting the cutter with its axis parallel to the direction of movement of the carriage, means mounted on the frame for grinding the cutter, a finger mounted on said frame arranged to abut against a blade of the cutter, the helix of the blade causing said finger to exert a rotative force on said cutter when the carriage is moved, and ball-bearings interposed between the rotative portion and stationary portion of said cutter supporting means, said bearings permitting the rotative portion to be freely rotated by said finger when the diameter of the cutter on which the finger acts is substantially smaller than the diameter of said rotative portion of the cutter supporting means.

3. A machine for grinding helical-blade milling cutters or the like comprising, in combination, a grinding wheel spindle, a work spindle adapted to rotatably support a cutter, a pair of supports respectively carrying said spindles and mounted for relative movement longitudinally of the cutter, a finger fixed relative to the grinding support and arranged to abut against a blade of the cutter, the helix of the blade causing said finger to rotate the cutter when relative movement longitudinally of the cutter is effected, and ball-bearings supporting said work spindle to permit said finger to turn the cutter freely when a cutter smaller than said work spindle is being ground.

4. A machine for grinding helical-blade milling cutters or the like comprising, in combination, a frame, grinding means mounted on said frame, a carriage slidably mounted on said frame, means for rotatably supporting a cutter comprising a member mounted on said carriage for adjustment about a vertical axis, an arm swingably mounted on said member for adjustment about a horizontal axis, a sleeve rotatably mounted in the free end of said arm and adapted to receive the shank of the cutter, the adjustments of said member and said arm permitting the side of the cutter being ground to be parallel to the direction of movement of the cutter, a finger mounted on said frame and arranged to abut against the blade being ground to rotate the cutter by movement of the carriage, and ball-bearings rotatably supporting said sleeve in the free end of said arm to prevent blocking of the rotation of the cutter when the latter has a smaller diameter than the bearings.

5. A grinding machine comprising, in combination, a frame, a carriage mounted for reciprocation on said frame, an adjustable work support mounted on said carriage, a motor carrying a grinding wheel, a post mounted on said frame, a universally adjustable motor support slidably mounted on said post, and manually operable means for vertically adjusting said motor support on said post comprising a bracket mounted for turning and fixed against vertical movement relative to said post, a guide rod fixed in said bracket parallel to said post for guiding said motor support, and a manually operable screw rotatably secured in said bracket closely adjacent said guide rod and threaded in said motor support.

CARL J. ANDERSON.